United States Patent
Nakanishi (10) Patent No.: US 8,498,450 B2
(45) Date of Patent: Jul. 30, 2013

(54) IMAGE DISCRIMINATING METHOD AND IMAGE PROCESSING APPARATUS

(75) Inventor: Toshiaki Nakanishi, Chiba (JP)

(73) Assignee: Sony Corporation, Tokyo (JP)

( * ) Notice: Subject to any disclaimer, the term of this patent is extended or adjusted under 35 U.S.C. 154(b) by 1282 days.

(21) Appl. No.: 10/596,295

(22) PCT Filed: Dec. 1, 2004

(86) PCT No.: PCT/JP2004/018230
§ 371 (c)(1),
(2), (4) Date: Sep. 6, 2007

(87) PCT Pub. No.: WO2005/057489
PCT Pub. Date: Jun. 23, 2005

(65) Prior Publication Data
US 2007/0297649 A1    Dec. 27, 2007

(30) Foreign Application Priority Data
Dec. 10, 2003 (JP) ............... P2003-412285

(51) Int. Cl.
*G06K 9/00* (2006.01)
(52) U.S. Cl.
USPC .............. 382/118; 382/103; 382/224
(58) Field of Classification Search
USPC .......... 382/103, 118, 224
See application file for complete search history.

(56) References Cited

U.S. PATENT DOCUMENTS
6,301,440 B1    10/2001    Bolle
7,415,137 B2 *   8/2008    Chen et al. .......... 382/115
7,440,593 B1 *  10/2008    Steinberg et al. ........ 382/118
2003/0071908 A1 *  4/2003    Sannoh et al. .......... 348/345
2003/0197792 A1   10/2003    Kikuchi
2004/0131235 A1 *  7/2004    Chen et al. .......... 382/115

FOREIGN PATENT DOCUMENTS

| JP | 2001-215404 | 8/2001 |
|---|---|---|
| JP | 2003-134453 | 5/2003 |
| JP | 2003-259290 | 9/2003 |
| JP | 2003-288601 | 10/2003 |
| JP | 2005-141523 | 6/2005 |

OTHER PUBLICATIONS

European Search Report corresponding to European Serial No. 04820213.9 dated Nov. 27, 2009.
International Search Report dated Feb. 8, 2005.
Japanese Office Action issued on Jul. 17, 2007.

* cited by examiner

*Primary Examiner* — Aaron W Carter
(74) *Attorney, Agent, or Firm* — Dentons US LLP (57) ABSTRACT

Scenes can be discriminated automatically and optimum prints corresponding to the scenes can be obtained.

A face of person is detected from an inputted image and it is determined whether or not a person is on the scene of the inputted image. If it is determined that a person is not on the scene of the inputted image, then it is determined that the inputted image is a landscape image. If it is determined that a person is on the scene of the inputted image, then the face area is calculated and the number of people is counted. If the face area is more than a predetermined ratio of the screen and the number of people is not less than a predetermined number of people, then it is determined that the inputted image is a snapshot of people image. If the face area is more than the predetermined ratio of the screen and the number of people is less than the predetermined number of people, then it is determined that the inputted image is a portrait image.

4 Claims, 6 Drawing Sheets

IMAGE DISCRIMINATING METHOD AND IMAGE PROCESSING APPARATUS

TECHNICAL FIELD

The present invention relates to an image discriminating method and an image processing apparatus suitable for use with a printer, a digital camera and so forth.

BACKGROUND ART

In general, when taking a picture, there are many scenes as a camera subject. Those scenes are portraits, children, souvenir photos at tourist resorts, landscapes, flowers, sports, night scenes, snapshots of people and so forth.

When a user composes the images and colors the thus composed images suitable for respective scenes, it is possible to make beautiful prints. In photographs, almost all people may be satisfied with the prints so long as the person's skin, in particular, can be printed beautifully.

If the skin color is made too clear, such clear skin color becomes unnatural, which will not become a desirable picture. On the other hand, with respect to the landscape, if the green of plants, the blue sky, flowers and the like are made vivid, they will provide desirable pictures. Digital cameras and digital printers have created various devices so far in order to print an image of each scene beautifully (see Cited Patent Reference 1).

[Cited Patent Reference 1]: Cited Patent Reference 1, Japanese Published Patent Application No. 2002-44451

Although conventional digital printers have tried to discriminate the scenes, accuracy in this scene discrimination is not sufficient and hence it is not possible to detect the person. For this reason, users were obliged to compose the image and to color the thus composed image with gradation reproducibility and color reproducibility which are made common to all images.

As a result, it is not possible to obtain the optimum prints suitable for respective scenes. For example, with respect to the portrait, it is desirable that users should compose the image and color the thus composed image under the condition in which reproduction of the skin color should be emphasized, gradation characteristics thereof should be soft in tone and in which the image should be quiet in finish while chroma thereof should be suppressed to be low. On the other hand, with respect to the landscape, it is desirable that the user should compose the image and color the thus composed image under the condition in which an image should be vivid, gradation characteristics thereof should be hard in tone and in which the image should be bright.

Since it has not been possible to automatically and precisely discriminate the scenes, users are unable to compose the optimum images and to color the thus composed optimum images suitable for respective scenes. The Cited Patent Reference 1 also described the fact that a user is obliged to discriminate the scenes and to compose the image in a manual fashion.

DISCLOSURE OF THE INVENTION

In view of the aforesaid aspects, it is an object of the present invention to provide an image discriminating method and an image processing apparatus by which the scenes can be discriminated automatically and the optimum prints corresponding to the scenes can be obtained.

In an image discriminating method according to an embodiment of the present invention, a face of person is detected from an inputted image and it is determined whether or not a person is on the scene of the inputted image. If it is determined that a person is not on the scene of the inputted image, then it is determined that the inputted image is a landscape image. If it is determined that a person is on the scene of the inputted image, then the face area is calculated and the number of people is counted. If the face area is more than a predetermined ratio of the screen and the number of people is not less than a predetermined number of people, then it is determined that the inputted image is portrait and snapshots of people image. If the face area is more than the predetermined ratio of the screen and the number of people is less than the predetermined number of people, then it is determined that the inputted image is a portrait image.

Further, an image processing apparatus according to an embodiment of the present invention includes an image input unit, a face detecting unit for detecting a face of person from image data from the image input unit, a face area calculating unit for calculating an area of face from a face detection signal from the face detecting unit, a number of people counting unit for counting the number of people based on the face detection signal, a face area ratio judging unit for judging whether or not the face area calculated by the face area calculating unit is more than a predetermined ratio, a number of people judging unit for judging the number of people counted by the number of people counting unit is less than a predetermined number of people and a gradation correcting unit for correcting gradation of the image data and a chroma correcting unit for correcting chroma in response to outputs from the face detecting unit, the face area ratio judging unit and the number of people judging unit.

With the above-described arrangement, according to the present invention, a portrait image, a snapshot of people image and a landscape image can be discriminated automatically, and a user is able to compose the optimum image and to color the optimum image at every different scene of a portrait, a snapshot of people and a landscape.

BEST MODE FOR CARRYING OUT THE INVENTION

An example of a best mode for carrying out an image discriminating method and an image processing apparatus according to the present invention will be described below with reference to the drawings.

Figure 2:
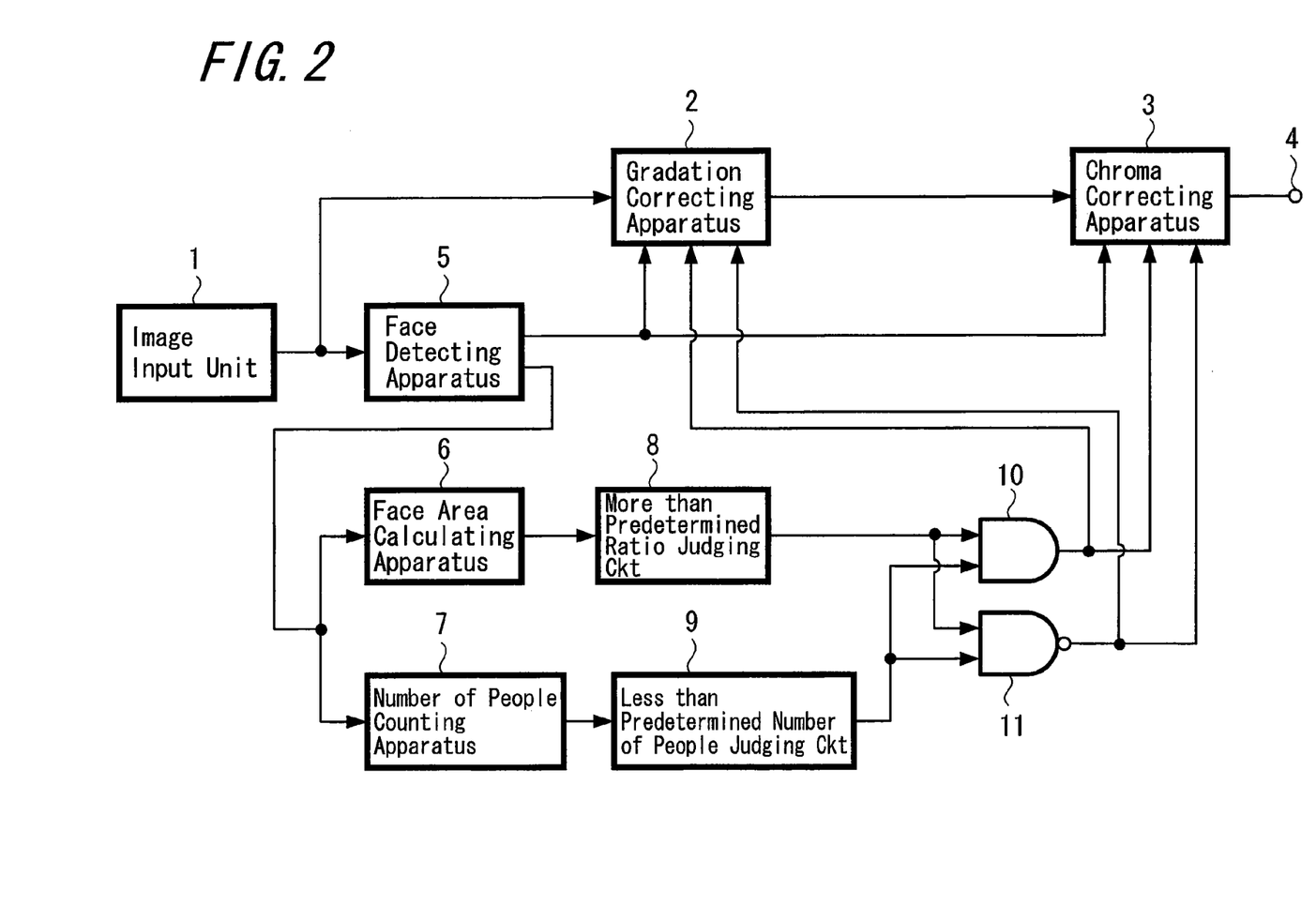
FIG. 2 is a block diagram showing an example of a best mode for carrying out an image processing apparatus according to an embodiment of the present invention.

FIG. 2 shows an image processing apparatus for use with a digital camera and a digital printer according to an embodiment of the present invention. Reference numeral 1 denotes an image input unit into which image data of a color image is inputted. The image data supplied to the image input unit 1 is supplied to an image data output terminal 4 through a series connection of a gradation correcting apparatus 2 to correct gradation of this image data and a chroma correcting apparatus 3 to correct chroma of this image data.

Figure 3:
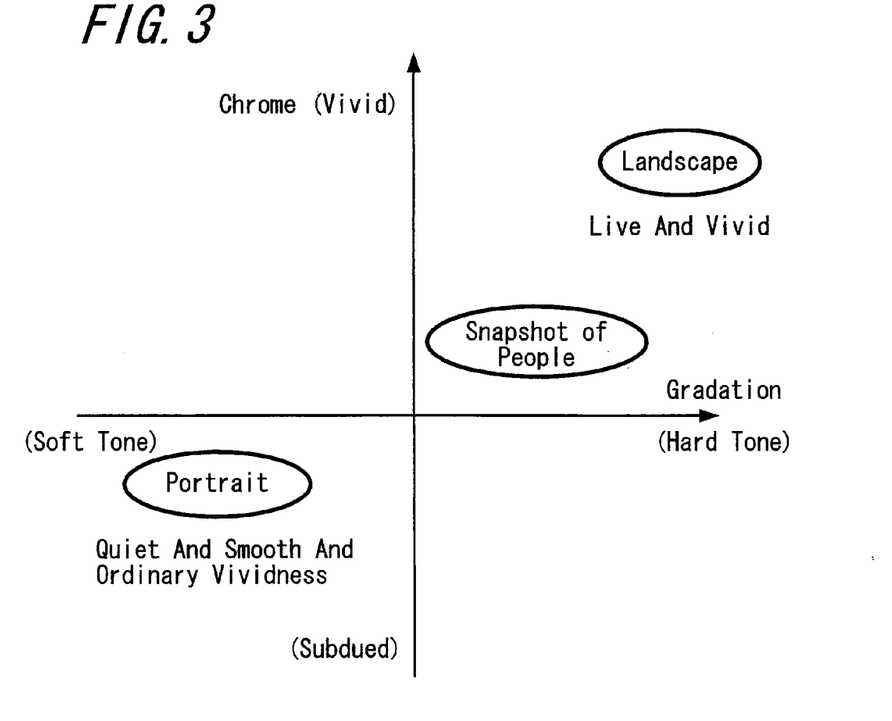
FIG. 3 is a diagram useful for explaining the present invention.

The gradation correcting apparatus 2 and the chroma correcting apparatus 3 are respectively composed of computers and they are configured so as to compose the image and to color the image at every scene in accordance with a conceptual diagram of FIG. 3 to compose the image in response to respective scenes of a portrait, a snapshot of people and a landscape.

In FIG. 3, the horizontal axis shows gradation characteristic in which gradation becomes a harder tone as it approaches the plus side (right-hand side) so that an image become vivid. As the gradation approaches the minus side (left-hand side), the gradation becomes a softer tone so that an image becomes soft.

The vertical axis shows the chroma axis in which as the chroma approaches the plus side (upper side), an image becomes clear and in which as the chroma approaches the minus side (lower side), chroma is decreased so that an image becomes subdued.

In the portrait, a desirable image should have a soft tone in gradation and of which chroma is not so high as shown in FIG. 3. When a digital camera takes a picture of a person with a flash in a short distance, gradation on the face tends to lose and a portrait image does not become a beautiful portrait image. In such a case, an image with a soft tone becomes a wet portrait image.

In the case of the landscape, as shown in FIG. 3, a desirable landscape image should have a harder tone and it should be vivid and bright. Also, in the case of the snapshot of people, as shown in FIG. 3, a desirable image should be an approximately intermediate image between the portrait image and the landscape image.

Figure 4:
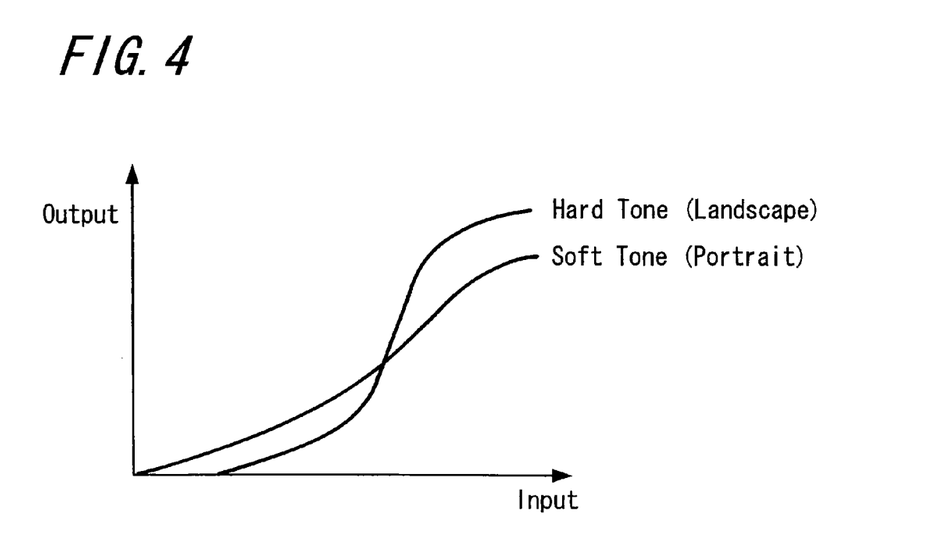
FIG. 4 is a diagram useful for explaining the present invention.

Further, FIG. 4 shows gradation characteristics of the gradation correcting apparatus 2. A desirable portrait image should have a characteristic curve of this soft tone and a desirable landscape image should have a characteristic curve of a hard tone.

In this embodiment, color image data supplied to this image input unit 1 is supplied to a face detecting apparatus 5. This face detecting apparatus 5 may be composed of a skin color area extracting unit 200 and a subject detecting unit 300 as shown in FIG. 5, for example (see Japanese Patent Application No. 2002-255865, for example).

Figure 6:
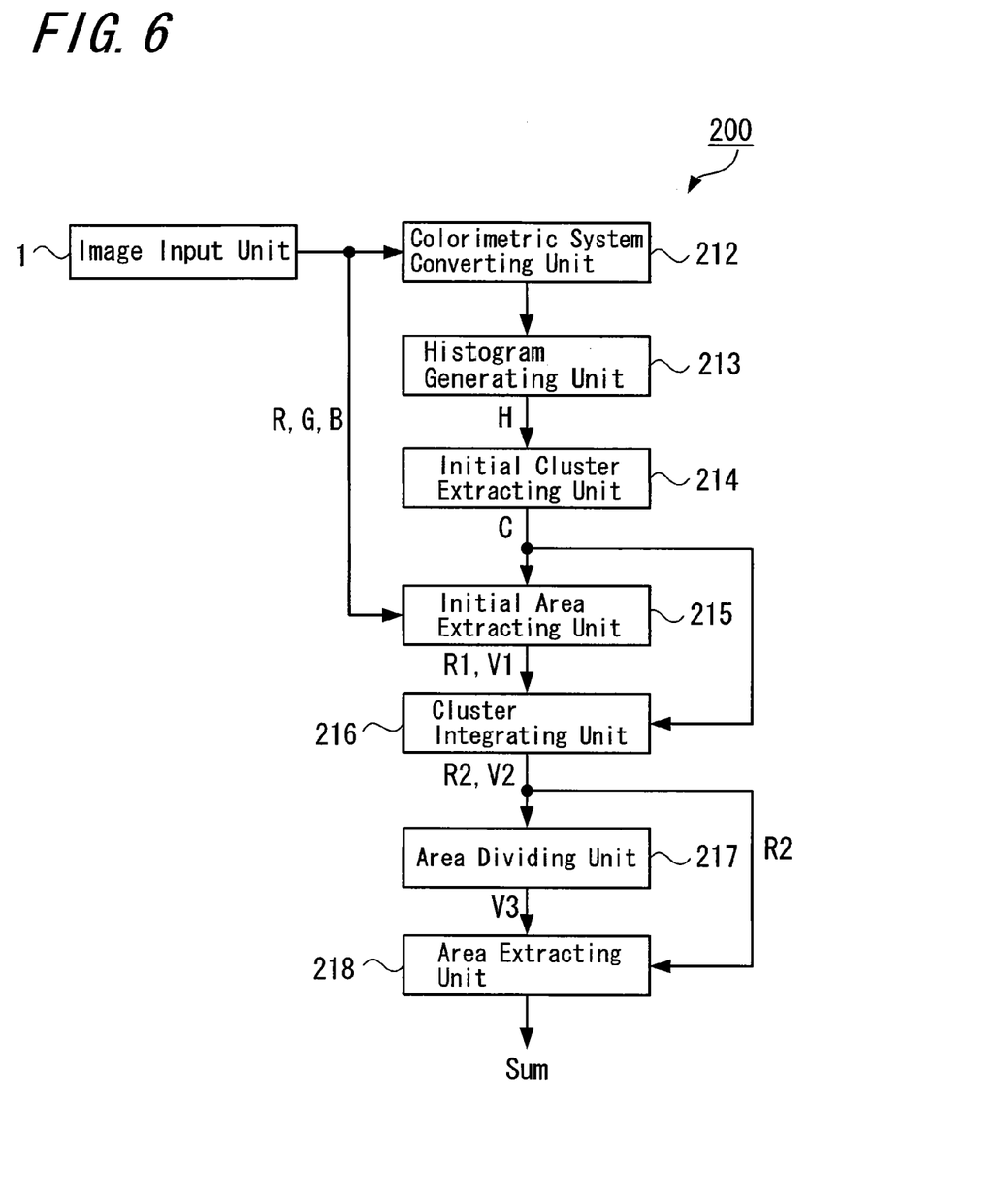
FIG. 6 is a block diagram showing an example of a skin color area extracting unit.

This skin color area extracting unit 200 is composed of, as shown in FIG. 6, a calorimetric system converting unit 212 that is a color converting unit to convert pixel values of color image data inputted from the image input unit 1 into coordinate values on the color space, a histogram generating unit 213 to generate a histogram representing a frequency of coordinate values converted on the color space, an initial cluster extracting unit 214 to extract a maximal point of the frequency in this histogram and nearby pixels as initial clusters, an initial area extracting unit 215 to extract a closed area containing the initial clusters from the initial clusters extracted by the initial cluster extracting unit 214 and the color image data supplied from the image input unit 1, a cluster integrating unit 216 to integrate the initial clusters as one cluster when a plurality of initial clusters is extracted within this initial area, an area dividing area 217 to divide this initial area into a plurality of areas in response to the state in which pixels are distributed within this initial area and an area extracting unit 216 for extracting an area that contains pixels belonging to clusters corresponding to the skin color. The skin color area extracting unit supplies the thus extracted skin color area to the subject detecting unit 300.

Figure 5:
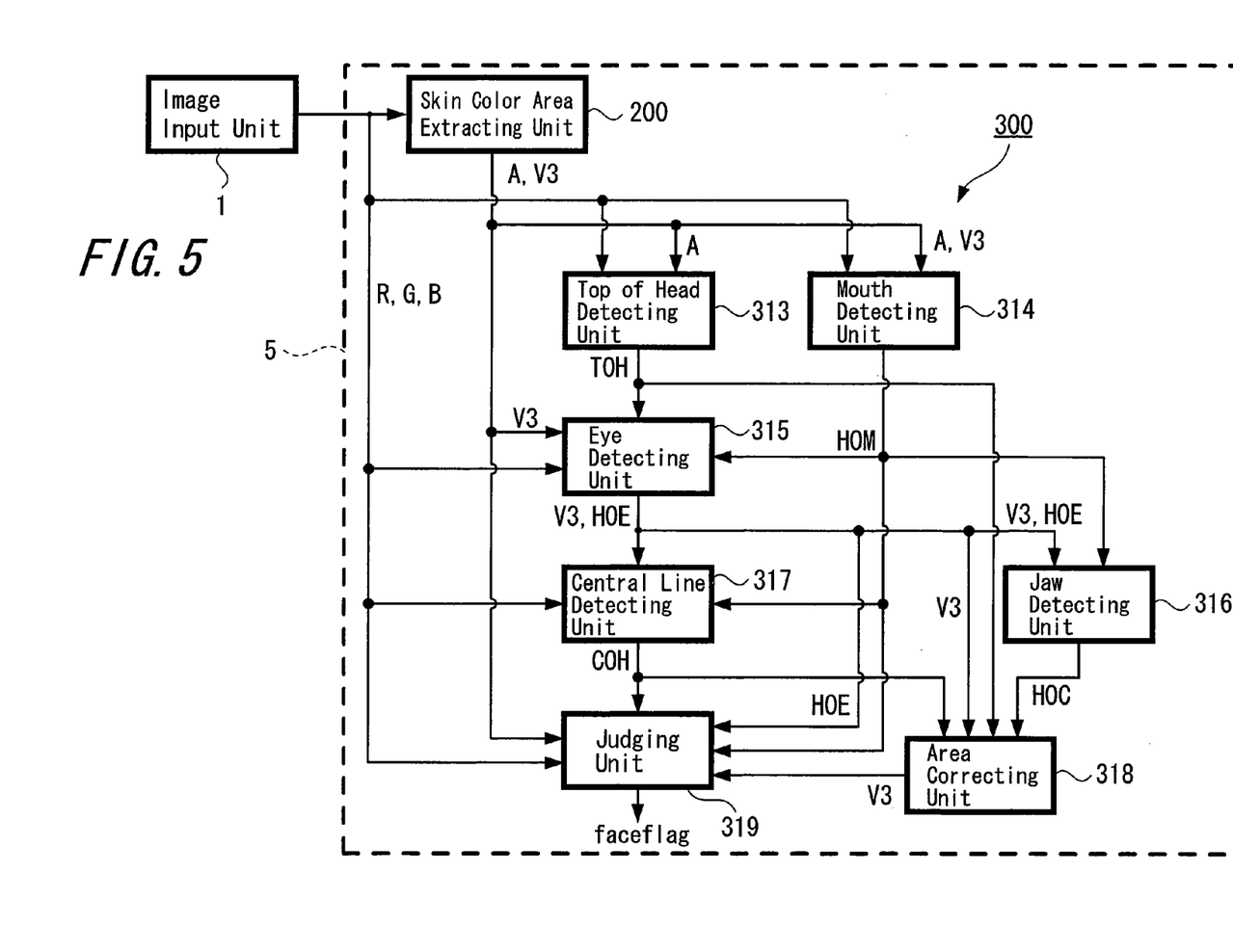
FIG. 5 is a block diagram showing an example of a face detecting apparatus.

The subject detecting unit 300 is composed of, as shown in FIG. 5, a top of head detecting unit 313 to which the color image data and the skin color area are inputted from the image input unit 1 and the skin color area extracting unit 200 and which detects the position of the top of head, a mouth detecting unit 314 to which the color image data and the skin color area are inputted and which detects the position of mouth, an eye detecting unit 315 to which the color image data, the skin color area, data of top of head and data of mouth are inputted and which detects the position of eyes, a jaw detecting unit 316 to which data of eyes and data of mouth are inputted and which detects the position of jaw, a central line detecting unit 317 to which the color image data, the data of mouth and the data of eyes are inputted and which detects the central line of the face, an area correcting unit 318 to which data of top of head, the data of eyes, the data of mouth and data of the central line are inputted and which corrects the face area and a judging unit 319 to which the color image data, the skin color area, the data of eyes, the data of mouth and correction data from the area correcting unit 318 are inputted and which judges whether or not the thus extracted skin color area V is the face.

Also, the face detecting apparatus 5 is not limited to the above-mentioned face detecting apparatus and there is proposed a face detecting apparatus capable of detecting the face based on recognition of the shape of face. At present, this method is higher in detection accuracy of face recognition. If faces are registered in advance as faces for use with face recognition, then detection accuracy in face recognition may be improved considerably. Any types of the face detecting apparatus 5 may be used in the present invention.

If the face is not recognized by the face detecting apparatus 5, then instruction signals are supplied from the face detecting apparatus 5 to the gradation correcting apparatus 2 and the chroma correcting apparatus 3. Then, it is determined by the gradation correcting apparatus 2 and the chroma correcting apparatus 3 that the inputted color image data is data indicative of a landscape image, and the gradation correcting apparatus and the chroma correcting apparatus may effect landscape correction on this color image data.

In this embodiment, a face recognition signal obtained at the face detecting apparatus 5 is supplied to a face area calculating apparatus 6 to calculate the face area and a number of people counting apparatus 7 to count the number of people.

In this case, unless the face is recognized by the face detecting apparatus 5, then the face recognition signal is not outputted from the face detecting apparatus. Thus, only when the face is recognized by the face detecting apparatus 5, the face recognition signals is supplied from the face detecting apparatus to the face area calculating apparatus 6 and the number of people counting apparatus 7.

Figure 7:
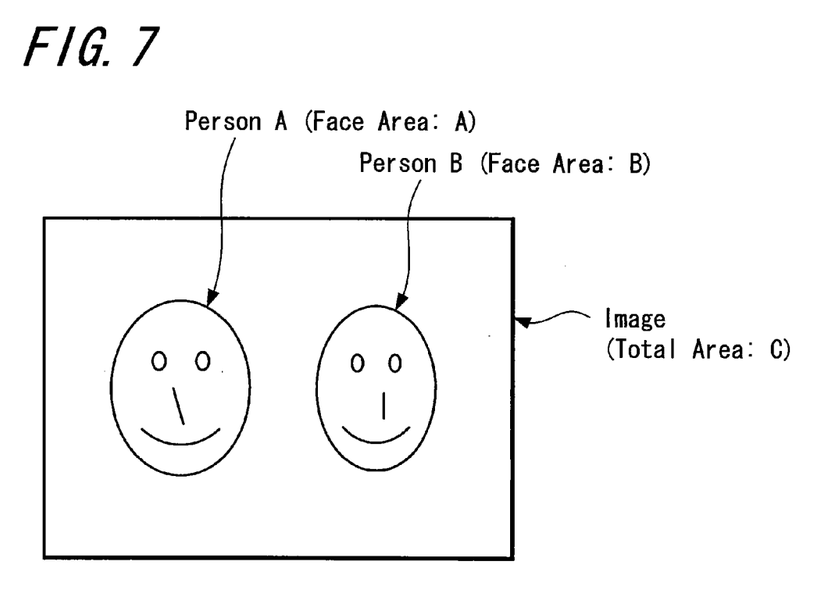
FIG. 7 is a diagram useful for explaining the present invention.

The face area calculating apparatus 6 calculates the face area and calculates a ratio at which the face area occupies the screen. When FIG. 7, for example, shows an example of a snapshot of people in which reference letter A assumes a face area of person A, reference letter B assumes a face area of person B and reference letter C assumes an area of the whole screen, the face area calculating apparatus calculates:

$$(A+B)/C \times 100 (\%)$$

The face area calculating apparatus 6 outputs at its output side data indicative of a calculated face area ratio (%). The data indicative of the calculated face area ratio is supplied to a more than predetermined ratio judging circuit 8 which judges whether or not the calculated face area ratio is more than a predetermined ratio, for example, 20%. If it is judged by the more than predetermined ratio judging circuit that the calculated face area ratio is more than the predetermined ratio, for example, 20%, then the more than predetermined ratio judging circuit 8 outputs at its output side a high level "1" signal. If not, then the more than predetermined ratio judging circuit outputs at its output side a low level "0" signal.

In this case, when an inputted image is a portrait, the face looks bigger and the ratio of the face area falls within a range of from about 20 to 30%. In this embodiment, criteria may be such that the face area ratio in the whole screen is more than 20%.

The number of people counting apparatus 7 counts the number of people in the screen and supplies a count value, that is, data indicative of the number of counted people to a less than predetermined number of people judging circuit 9 which judges whether or not the number of the counted people is less than a predetermined number of people, for example, three persons.

If it is determined by the less than predetermined number of people judging circuit that the number of the counted people is less than the predetermined number, for example, three, then the less than predetermined number of people judging circuit 9 outputs at its output side a high level "1" signal. If not, for example, the number of the counted people is more than four, then the less than predetermined number of people judging circuit outputs at its output side a low level "0" signal.

An output signal from the more than predetermined ratio judging circuit 8 and an output signal from the less than predetermined number of people judging circuit 9 are supplied to one input terminal and the other input terminal of an AND circuit 10, respectively. When a high level "1" signal is outputted at the output side of the AND circuit 10, it is determined that the ratio of the face area is more than the predetermined ratio, for example, 20% and that the number of the counted people is less than the predetermined number of people, for example, three. Then, this high level "1" signal is supplied to the gradation correcting apparatus 2 and the chroma correcting apparatus 3 as the instruction signal. Then, it is determined by the gradation correcting apparatus 2 and the chroma correcting apparatus 3 that this color image data is image data indicative of a portrait image, and the gradation correcting apparatus and the chroma correcting apparatus effect the portrait correction on this color image data.

Also, the output signal from the more than predetermined ratio judging circuit 8 and the output signal from the less than predetermined number of people judging circuit 9 are supplied to one input terminal and the other input terminal of a NAND circuit 11, respectively. When a high level "1" signal is obtained at the output side of the NAND circuit 11, this high level "1" signal is supplied to the gradation correcting apparatus 2 and the chroma correcting apparatus 3 as an instruction signal. Then, it is determined by the gradation correcting apparatus 2 and the chroma correcting apparatus 3 that the color image data is image data indicative of portrait and snapshot of people image, and the gradation correcting apparatus and the chroma correcting apparatus effect the snapshot of people correction on this color image data.

Figure 1:
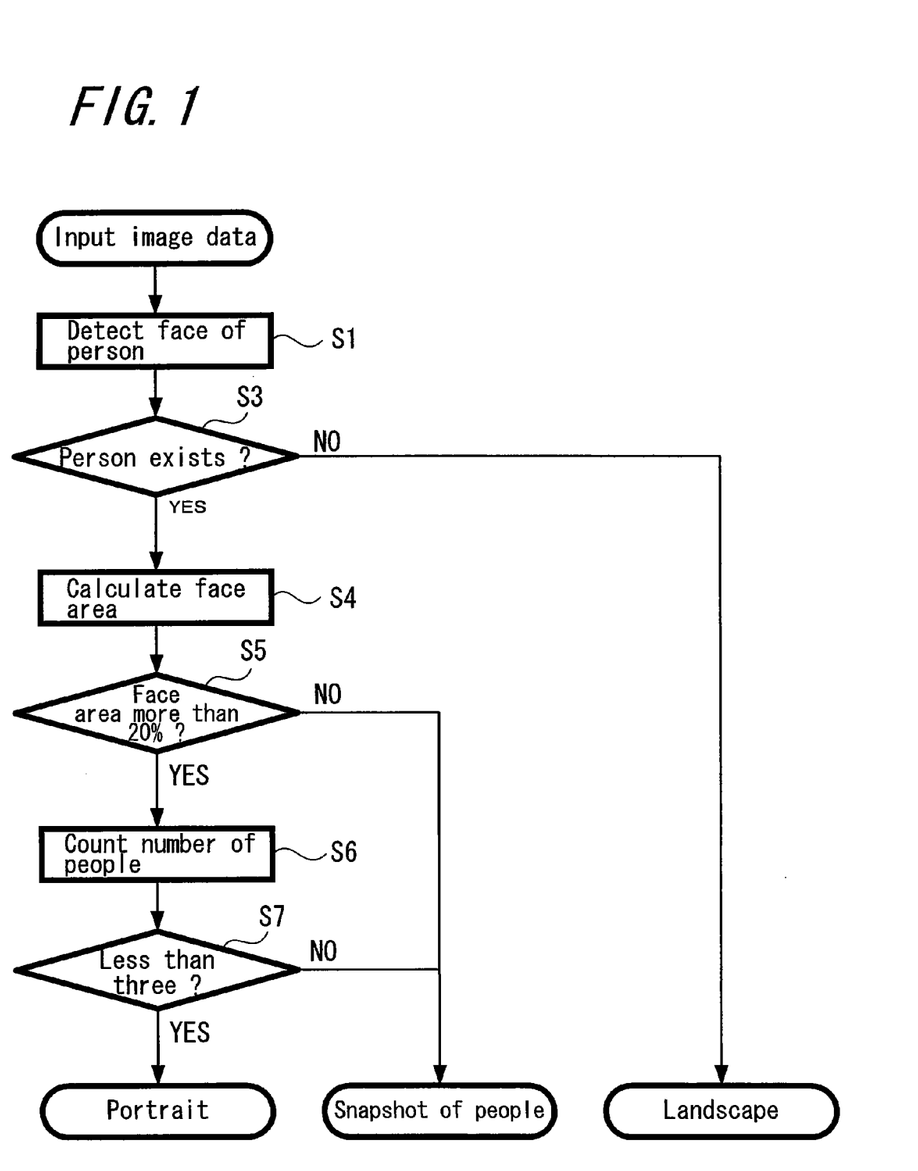
FIG. 1 is a flowchart showing an example of a best mode for carrying out an image discriminating method according to an embodiment of the present invention.
Figure 8:
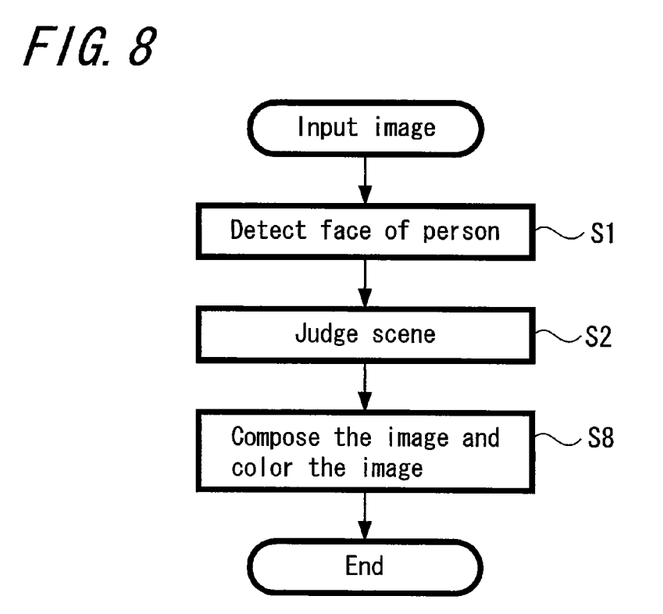
FIG. 8 is a flowchart useful for explaining the present invention.

Operations of the above-mentioned arrangement according to the embodiment of the present invention will be described with reference to flowcharts of FIGS. 1 and 8. When color image data is inputted, first, the face is detected by the face detecting apparatus 5 (step S1). Then, the scene is discriminated (step S2). Scene discrimination (step S2) is carried out as shown in FIG. 1. In this scene discrimination, first, the presence of person is judged, that is, it is determined whether or not a person exists in this color image data, and a face recognition signal is obtained (step S3). In this case, if it is determined that no person exists in this color image data, then it is judged that this color image data is image data indicative of a landscape image.

If it is determined that a person exists in this color image data, then the area of face is calculated from the face recognition signal of this image data by the face area calculating apparatus 6 (step S4). Then, it is determined whether or not the ratio of the face area relative to the screen is more than the predetermined ratio, for example, 20% (step S5).

If the ratio of the face area relative to the screen is less than the predetermined ratio, for example, 20%, then it is determined that this image data is data indicative of a snapshot of people image. If the ratio of this face area is more than the predetermined ratio, for example, 20%, then the number of people in this image data is counted by the number of people counting apparatus 7 (step S6). After that, it is determined whether or not the counted number of people is less than the predetermined number of people, for example, three (step S7).

If it is determined at the step S7 that the counted number of people is not less than the predetermined number of people, for example, more than four, then it is judged that this image data is image data indicative of a snapshot of people image. If it is determined at the step S7 that the counted number of people is less than the predetermined number of people, for example three, then it is judged that this image data is image data indicative of a portrait image.

In the flowchart of FIG. 1, the order of the steps S4 and S5 and the order of the steps S6 and S7 may be reversed. Also in this case, it can be easily understood that the same results as those mentioned above may be obtained.

When this scene discrimination (step S2) is ended, the user may compose the optimum image and color the thus composed optimum image in response to this scene discrimination (step S8), and control is ended.

According to the embodiment of the present invention, it is possible to automatically and accurately discriminate a portrait image, a snapshot of people image and a landscape image. Hence, the user is able to compose the optimum image and to color the thus composed optimum image at every different scene of the portrait, the snapshot of people and the landscape.

While the example in which the portrait image, the snapshot of people image and the landscape image are discriminated and classified and the gradation correcting apparatus 2 and the chroma correcting apparatus 3 are used to compose the image and to color the thus composed image in response to the classifications has been described so far, the present invention is not limited thereto. It is needless to say that the number of classifications may be increased, for example, in the case of the landscape, the landscape may be further classified into distinctive scenes such as tree, sea, sky, snow scene, night scene and building and that the gradation correcting apparatus 2 and the chroma correcting apparatus 3 may be used to compose the image and to color the thus composed image in response to these increased classifications.

Further, the present invention is not limited to the above-mentioned example and it is needless to say that the present invention can take various arrangements without departing from the gist of the present invention.

The invention claimed is:

1. An image discriminating method comprising the steps of:

processing an inputted image to detect faces of one or more persons in the inputted image;

detecting at least one face of a person in the inputted image;

determining that the inputted image is a landscape photo image when no face is detected in the inputted image;

calculating an area of each detected face in the inputted image;

counting the number of faces detected in the inputted image;

determining that the inputted image is a snapshot photo image when (a) a ratio of the total area of all of the faces to the total area of the inputted image is no more than a first predetermined value, or (b) the ratio of the total area all of the faces to the total area of the inputted image images is more than the first predetermined value and the number of faces is no less than a second predetermined number;

determining that the inputted image is a portrait image when the ratio of the total area of all of the faces to the total area of the inputted image is more than the first predetermined value and the number of faces is less than the second predetermined number; and correcting gradation and chroma of the inputted image based on whether the inputted image is determined to be a landscape photo image, a snapshot photo image, or a portrait image.

2. An image discriminating method according to claim 1, wherein said first predetermined value is 20% and said second predetermined number of faces is three.

3. An image processing apparatus comprising:

a processing unit that processes an inputted image to detect faces of one or more persons in the inputted image;

a detecting unit that detects at least one face of a person in the inputted image;

a calculating unit that calculates an area of each detected face in the inputted image;

a counting unit that counts the number of faces detected in the inputted image;

an image determining unit that determines
   (a) the inputted image is a landscape photo image when no face is detected in the inputted image,
   (b) the inputted image is a snapshot image when (i) a ratio of the total area of all of the faces to the total area of the inputted image is no more than a first predetermined value, or (ii) the ratio of the total area of all of the faces to the total area of the inputted image images is more than the first predetermined value and the number of faces is no less than a second predetermined number, and
   (c) the inputted image is a portrait image when the ratio of the total area of all of the faces to the total area of the inputted image is more than a first predetermined value and the number of faces is less than the second predetermined number;

a gradation correcting unit that corrects gradation of the inputted image based on the results of image determining unit; and a chroma correcting unit that corrects chroma of the inputted image based on the results of image determining unit.

4. An image processing apparatus according to claim 3, wherein said first predetermined value is 20% and said second predetermined number of faces is three.

* * * * *